(12) United States Patent
Kundermann et al.

(10) Patent No.: US 6,698,561 B2
(45) Date of Patent: Mar. 2, 2004

(54) HYDRODYNAMIC CLUTCH DEVICE

(75) Inventors: Wolfgang Kundermann, Schweinfurt (DE); Jörg Sudau, Niederwerrn (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/844,240

(22) Filed: Apr. 27, 2001

(65) Prior Publication Data

US 2001/0042666 A1 Nov. 22, 2001

(30) Foreign Application Priority Data

May 16, 2000 (DE) .......................... 100 23 983

(51) Int. Cl.⁷ .............................................. F16D 33/00
(52) U.S. Cl. ...................................... 192/3.29; 192/3.3
(58) Field of Search ................................. 192/3.29, 3.3

(56) References Cited

U.S. PATENT DOCUMENTS

| | | | | |
|---|---|---|---|---|
| 4,177,885 A | * | 12/1979 | Ross .......................... 192/3.3 |
| 4,431,094 A | * | 2/1984 | Parthuisot et al. ........... 192/3.3 |
| 5,348,127 A | * | 9/1994 | Murata et al. ................ 192/3.3 |
| 5,575,363 A | * | 11/1996 | Dehrmann et al. ....... 192/113.3 |
| 5,715,920 A | * | 2/1998 | Lindner et al. .......... 192/111 A |
| 6,016,894 A | * | 1/2000 | Kundermann ............ 192/213.1 |
| 6,142,272 A | * | 11/2000 | Meisner et al. .............. 192/212 |

\* cited by examiner

*Primary Examiner*—Rodney H. Bonck
*Assistant Examiner*—Eric M. Williams
(74) *Attorney, Agent, or Firm*—Cohen, Pontani, Lieberman & Pavane

(57) ABSTRACT

A turbine impeller rotates around a rotational axis in a housing unit, and a bridging clutch unit has a clutch element connected in an essentially nonrotatable fashion to the turbine impeller. The clutch element has friction area which can be brought into frictional contact with an opposing friction area on the housing unit. A pretensioning device acts on the clutch element to pretension it against the opposing friction area.

16 Claims, 3 Drawing Sheets

HYDRODYNAMIC CLUTCH DEVICE

BACKGROUND OF THE INVENTION

1. Field of the Invention

The present invention pertains to a hydrodynamic clutch device, especially to a hydrodynamic torque converter or fluid clutch, comprising a housing unit; a turbine impeller rotating around a rotational axis in the housing unit; and a bridging clutch unit, which has a clutch element connected in essentially nonrotatable fashion to the turbine impeller. A friction area of this clutch element can be brought into frictional contact with an opposing friction area provided on the housing unit.

2. Description of the Related Art

In hydrodynamic clutch devices designed in this way, it is known that, in order to actuate the lock-up clutch unit, that is, to produce or to release the essentially direct torque-transmitting connection between the turbine impeller and the housing unit, the pressure relationships inside the housing unit must be adjusted in such a way that either the friction area of the clutch element is pressed more strongly against the opposing friction area or that this mutual frictional contact is released. For this purpose, there must be a positive pressure of at least 1 bar inside the housing unit, in some cases as much as 2 or 3 bars. This requires a correspondingly high pressure-generating capacity, that is, delivery capacity, and thus to a relatively expensive design.

It is also known that the clutch element, which is designed essentially as a ring-shaped disk and is made of sheet metal, can be attached by its radially inward area to the turbine impeller by rivets or welds, for example, and to design it with a contour or shape which allows its own elasticity to pretension it toward the housing unit, i.e., to pretension its friction area toward the opposing friction area. Providing a pretensioning force of this type already provides a certain baseline frictional interaction, so that the increase in pressure required to produce a bridging state does not have to be as large. In this type of design, in order to produce the non-bridged state, an opposing pressure must be built up in the area between the clutch element and the housing unit not containing the turbine impeller, this opposing pressure working ultimately against the inherent preload of the clutch element.

This arrangement suffers from the disadvantage that, to obtain a sufficiently stable arrangement, the clutch element must be designed with a comparatively high degree of stiffness. This means that the pretensioning force is also correspondingly large, and ultimately the opposing force, which must be generated to produce the unbridged state, is again associated with the need to provide a fluid feed pump of relatively high capacity.

SUMMARY OF THE INVENTION

It is the task of the present invention to provide a hydrodynamic clutch device in which a comparatively small pressure change in the housing unit can initiate or to release the torque-transmitting state between the housing unit and the turbine impeller produced by the use of the bridging clutch unit.

According to the present invention, this task is accomplished by a hydrodynamic clutch device, especially a hydrodynamic torque converter or fluid clutch, comprising a housing unit; a turbine impeller rotating around a rotational axis in the housing unit; and a bridging clutch unit, which has a clutch element connected in essentially nonrotatable fashion to the turbine impeller, this clutch element being provided with a friction area which can be brought into frictional contact with an opposing friction area on the housing unit.

The hydrodynamic clutch device according to the invention also has a pretensioning unit, which acts on the clutch element to pretension it toward the opposing friction area.

By providing the pretensioning unit, it is also guaranteed that a certain baseline contact already exists between the friction area and the opposing friction area, regardless of the pressure relationships which have been established. Because a pretensioning unit separate from the clutch element is provided here, the pretensioning force produced by it can be adjusted independently of how the clutch element itself is designed. This means that the pretensioning force can be adjusted so that only a comparatively small release force, generated by fluid pressure and acting against the pretension, is required to actuate the clutch element for the purpose of releasing the mutual frictional contact. This has the result that fluid feed pumps of considerably smaller delivery capacity or significantly smaller pressure-generating capacity can be used and that the entire environment in which a hydrodynamic clutch device of this type is used can thus be built in a more cost-favorable fashion.

For example, the pretensioning device may include at least one pretensioning spring element, the force of which acts between the clutch element and the turbine impeller.

This pretensioning element, at least one of which is provided, can comprise a leaf spring element, which is permanently connected by at least one attachment area to the turbine impeller or to the clutch element, and which also has an actuating area, which acts on the other unit, i.e., either the clutch element or the turbine impeller. Leaf spring elements of this type can be produced at very low cost and in particular show uniform elastic and force characteristics in operation over a long service life.

The leaf spring element is preferably attached permanently to the turbine impeller, such as to the hub of the turbine impeller. This offers the advantage that, in the area of the clutch element itself, no connecting measures for producing a permanent connection, such as a riveted connection, must be taken. As a result, no leaky areas which could allow the undesirable exchange of fluid between the two fluid chamber areas in the housing unit separated by the clutch element are produced on the clutch element itself.

In a further embodiment, the pretensioning spring element, at least one of which is provided, may include a disk spring element, a corrugated spring element, or the like, which is supported on the turbine impeller, preferably on the hub of the turbine impeller, and the clutch element.

In a further embodiment, at least one pretensioning spring element acts between the clutch element and a driver element, which element is provided on the hub of the turbine impeller and is in torque-transmitting engagement with the clutch element. This driver element can be provided in a radially outward area of the turbine impeller, and it can be in torque-transmitting engagement with a radially outward area of the clutch element.

To ensure that suitable surface-to-surface contact not impaired by any type of deformation is achieved when the clutch element produces frictional contact between itself and the housing unit or the opposing friction area, it is proposed that the clutch element be essentially rigid. The phrase "essentially rigid" in the sense of the present invention means that it is not necessary for the clutch element to undergo any deformation to produce or to release the torque-transmitting connection between the turbine impeller and the housing unit. Instead, the clutch element should be so rigid that, aside from the minimal deformations necessarily present as a result of the forces acting on it, it is made available for interaction with the housing unit or the opposing friction area essentially in its original, as-produced shape, so that suitable frictional contact is always guaranteed between the friction area and the opposing friction area.

To guarantee also the required axial movement of the clutch element, at least in the part carrying the friction area, the clutch element can be movable with respect to the turbine impeller in the direction of the rotational axis. For this purpose, the clutch element can be mounted on the turbine impeller, preferably on a turbine impeller hub, in an essentially fluid-tight manner, so that it can be shifted in the direction of the rotational axis.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

Figure 1:
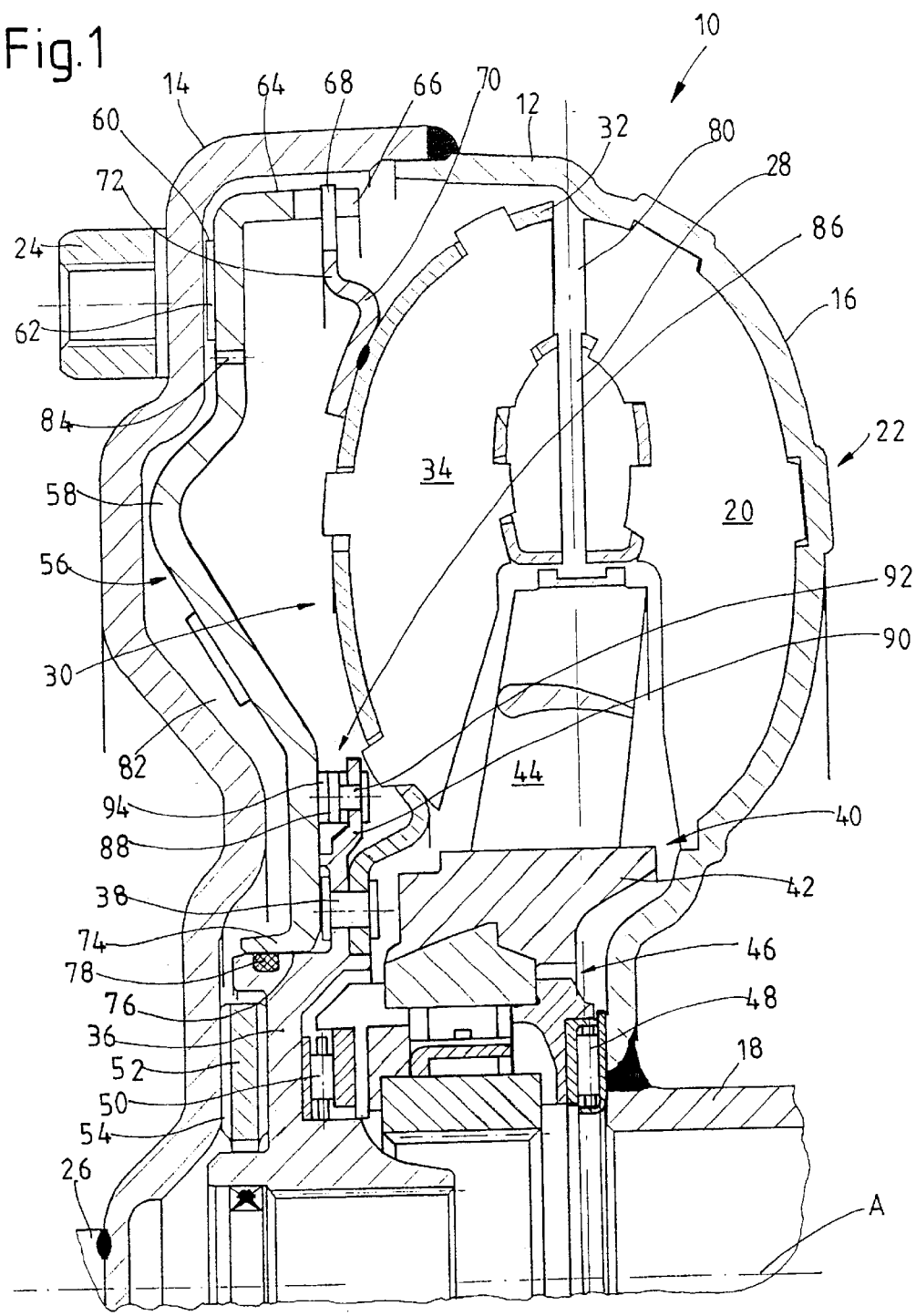
FIG. 1 shows a partial longitudinal cross section through a hydrodynamic clutch device according to the invention.

FIG. 1 shows a first embodiment of a hydrodynamic clutch device according to the invention in the form of a hydrodynamic torque converter 10. The torque converter 10 comprises a housing unit 12 with the housing cover 14 and the outer shell 16 of a pump impeller, connected permanently by welding, for example, to the housing cover 14, radially on the outside. This pump impeller outer shell 16 is permanently connected by welding, for example, in its radially inner area to a pump impeller hub 18. A fluid feed pump can be driven by the pump impeller hub 18. On each inside surface, the pump impeller shell 16 carries a plurality of pump impeller vanes 20, which ultimately, together with the pump impeller shell 16 and the pump impeller hub 18, forms a pump impeller 22.

The housing cover 14 carries a plurality of connecting elements 24 on its radially outer area. These elements extend in a row around the circumference and can be connected permanently to a so-called "flex plate" or some other type of clutch unit by screws. In this way, a nonrotatable connection to the drive shaft can be produced. In the central area, the centering pin 26 can be provided on the housing cover 14; this pin fits into a corresponding centering hole in the drive shaft to align the rotational axis A of the hydrodynamic torque converter 10 with the rotational axis of the drive shaft.

In the interior space 28 of the housing unit 12 there is a turbine impeller 30 having a turbine impeller outer shell 32, which carries a plurality of turbine impeller vanes 34 on its inside surface. The turbine impeller shell 32 can be made of a bent piece of sheet metal, which radially toward the inside is permanently connected to a turbine impeller hub 36, which is usually a metal casting or a part turned on a lathe. The connection between these two components can be produced by clinch bolts 38, but it can also be produced by, for example, a torsional vibration damper unit.

A stator 40, located axially between the pump impeller 22 and the turbine impeller 30, has a plurality of stator vanes 44 on the stator outer ring 42. The stator outer ring 42 is supported via a free impeller device 46 on a support element (not shown), such as a hollow support shaft passing coaxially through the pump impeller hub 18. The way in which it is supported allows the stator outer ring to rotate around rotational axis A in one direction but not in the opposite direction. A drive shaft, such as the input shaft of a transmission, extends coaxially inside this support element (not shown). The drive shaft can be connected and disconnected from the turbine impeller hub 36 for rotation in common.

At both axial ends, the stator 40, i.e., the free impeller device 46, is supported by bearing assemblies 48, 50 with respect to the pump impeller 22, that is, with respect to the housing unit 12 on one side and the turbine impeller hub 36 on the other. The bearing assemblies 48, 50 can be designed as rolling element bearings, for example, or as plain bearings. Between the turbine impeller hub 36 and the housing cover 14 is an additional bearing assembly 52, in the form of a plain bearing ring. This has radially extending grooves 54 along which a fluid exchange can occur, as will be described in detail further below. A fluid exchange can also occur in the area of one of the bearing assemblies 48, 50.

The hydrodynamic torque converter 10 also has a bridging clutch unit 56, which can be used to produce a direct torque-transmitting connection between the housing unit 12, namely, the housing cover 14, and the turbine impeller 30. This bridging clutch unit 56 has a clutch piston 58, formed, for example, by the forming of a sheet metal blank. In its radially outer area, the clutch piston 58 can carry, for example, a friction facing 60, which can be pressed against an opposing frictional surface 62 on the housing cover 14. It should be pointed out that a friction facing could obviously be provided also or alternatively on the housing cover 14.

In a radially outer, cylindrical section 64, extending essentially in the axial direction, the clutch piston 58 has a plurality of axially extending clutch projections 66, which ultimately form a set of clutch teeth. These clutch teeth or clutch projections 66 are in essentially clearance-free, torque-transmitting engagement with driver projections 68, this other set of projections being provided on a driver element 70. The driver element 70 is fastened by welding, for example, to the turbine impeller outer shell 32, and the section 72 of this driver element, i.e., the section carrying the driver projections 68, extends outward approximately in the radial direction.

The clutch piston 58 has a radially inner section 74, which extends axially and can be cylindrical. This possibly cylindrical section is supported on an appropriately shaped opposing surface 76 of the turbine impeller hub 36 in such a way that it can slide in the axial direction. A sealing element 78, such as an O-ring, is present between the section 74 and the turbine impeller hub 36. The element 78 is inserted into an appropriate recess in the outer circumferential surface 76 of the turbine impeller hub 36 and makes it possible for the clutch piston 58 to slide on the turbine impeller hub 36 in a fluid-tight manner. In its given form as an essentially rigid component, the clutch piston 58 is therefore displaceable in the axial direction with respect to the turbine impeller hub 36 and thus also with respect to the entire turbine impeller 30. When the fluid pressure in the space 80 between the clutch piston 58 and the pump impeller outer shell 16, containing the turbine impeller 30, is made greater than that in the space 82 between the clutch piston 58 and the housing cover 14, then an engaging force is generated, which moves the clutch piston 58 toward the housing cover 14. This force thus presses the friction facing 60 against the opposing frictional surface 62. Depending on the pressure difference which has developed, a slipping state of the bridging clutch unit 56 or an essentially slip-free bridging state can be established. So that fluid circulation can be maintained and heated fluid can be replaced by fresh, cooler fluid even in the bridged state, in which a fluid exchange between the two spaces 80, 82 would not in principle be possible, the clutch piston 58 can be provided with at least one throttle opening 84, which allows fluid to flow between the two spaces 80, 82, but only to such an extent that an established pressure difference remains essentially unchanged.

The hydrodynamic torque converter 10 according to the invention also has a pretensioning unit 86 which guarantees that the clutch piston 58 is preloaded with a specific, predefined pretensioning force in the direction toward the housing cover 14. Apart from any contact forces generated by the fluid pressure relationships, this guarantees a certain baseline frictional interaction between the clutch piston 58 and the housing unit 12. Let it be assumed, for example, that, without the provision of the pretensioning unit 86 in the space 80, a positive fluid pressure of, say, 1 bar with respect to space 82 would have to be present in order to generate a sufficient contact force. If now, through the provision of the pretensioning unit 86, the clutch piston 58 is already being pressed against the housing cover 14 by a force equal to half the contact force produced by this excess fluid pressure, then to obtain the desired frictional interaction, all that is needed is a pressure difference or a positive pressure of only about 0.5 bar. On the other hand, it is also necessary to build up a certain fluid pressure to obtain a completely bridge-free state in space 82, namely, a fluid pressure which is sufficient to counteract the pretensioning force of the pretensioning unit 86 and which, in the example being discussed here, is also in the range of approximately 0.5 bar.

From this it can be seen that, in conjunction with a hydrodynamic torque converter 10 designed in this way, the fluid feed pump which must be provided can have a much smaller delivery capacity or a much smaller pressure-generating capacity, with the result that much more simply built and lower-cost feed pumps can be used. The only requirement is that it must be possible to increase the fluid pressure in the space 82 with respect to the fluid pressure in the space 80 so that the frictional interaction in the area of the bridging clutch unit 56 can be suspended. This can be done, for example, by conveying the working fluid into the space 82 through a central opening in the drive shaft (not shown) and through the fluid channels 54 in the plain bearing element 52, with the result that a positive pressure with respect to space 80 is built up in this space 82. This means ultimately that a directional control valve, for example, must be used to ensure that, depending on the state to be produced in the area of the bridging clutch unit 56, the pressure fluid is fed either to space 80 or to space 82.

In the case of the embodiment shown in FIG. 1, the pretensioning unit 86 compresses a plurality of leaf spring elements 88. These extend in the circumferential direction and are fastened at one end by clinch bolts 92 or the like to a flange-like or otherwise projecting section 90 of the turbine impeller hub 36. This flange-like outer section is situated outside the riveted connection between the turbine impeller hub 36 and the turbine impeller outer shell 32. The other end of the spring element proceeding approximately in the circumferential direction has an actuating section 94, which faces the clutch piston 58 and rests ultimately on the clutch piston 58 to actuate it. It is ensured in this way that the actuation of the clutch piston 58 is accomplished without the need for any kind of rivet elements or the like on it, which would tend to cause unwanted leaks in this area. Of course, the leaf spring element(s) 88 can be designed in many different ways. For example, as already discussed, one end can be attached to the turbine impeller hub 36, and the other end can serve as the actuation area 94 for actuating the clutch piston 58. In principle, the other end of the leaf spring elements 88 could also be supported on or attached to the turbine impeller hub 36, in which case the bulging area between these two ends would form the actuating area 94. The leaf spring elements 88 could also be connected by their centers to the turbine impeller hub 36; the actuating areas 94 would thus be at the ends of the parts proceeding in both circumferential directions from the center. In principle, it would also be possible to conceive of a design of a leaf spring element of this type which consists of a corrugated spring-like shape extending all the way around the circumference.

Figure 2:
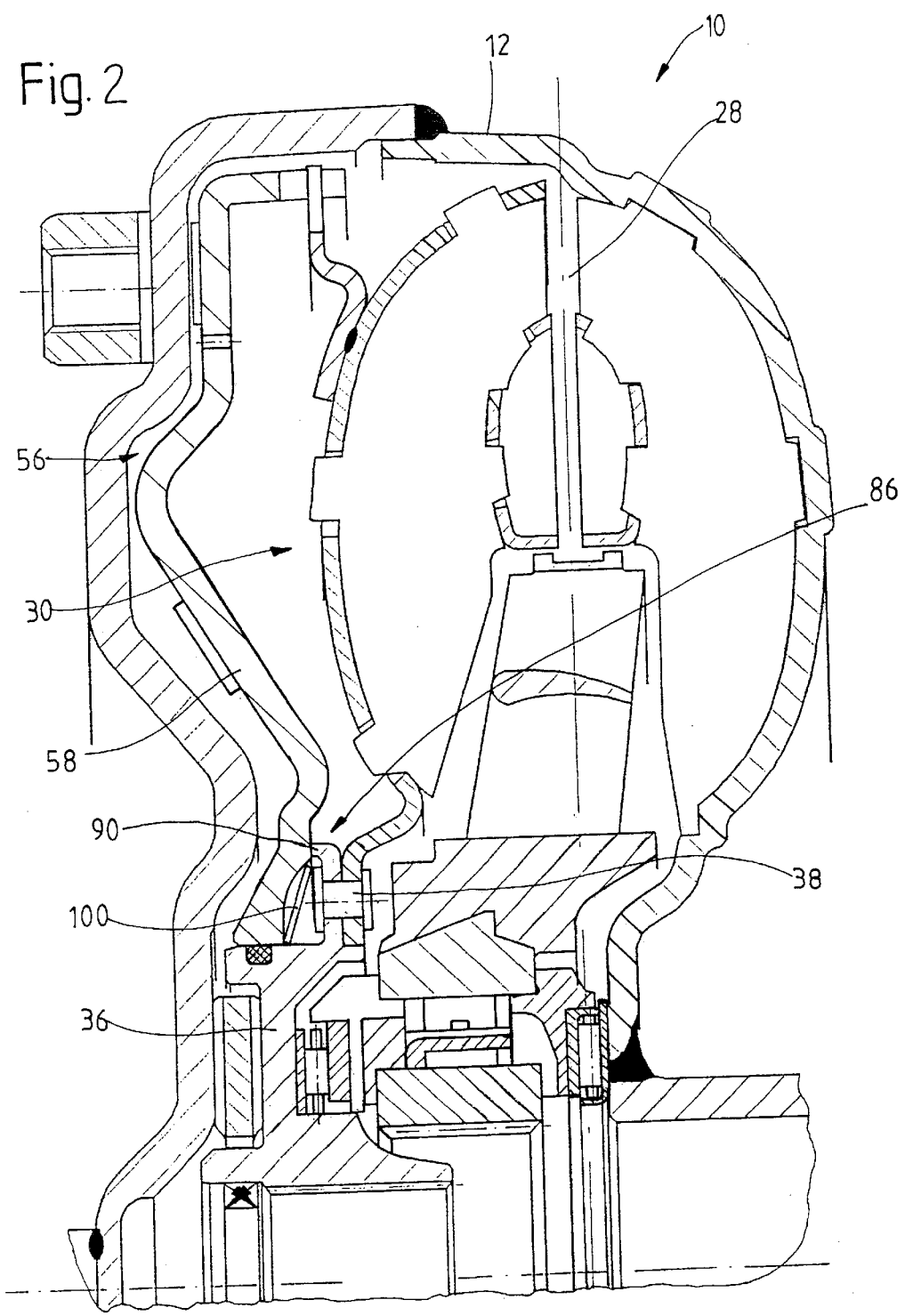
FIG. 2 shows a modified embodiment in a view similar to that of FIG. 1.

An alternative embodiment of the hydrodynamic torque converter 10 according to the invention is shown in FIG. 2. In this embodiment, the hydrodynamic torque converter 10 corresponds in principle to the previously described design, so that reference can be made to the preceding discussion. Here the pretensioning device 86 comprises a spring element 100, designed like a disk spring or corrugated spring, etc. In the disk spring design, the spring is supported axially by its inner radial area against the radially inner end area of the clutch piston 58 and is supported in its radially outer area against the clinch bolts 38 and/or the turbine impeller hub 36, that is, the section 90 of the hub extending radially outside the clinch bolts 38. In this design of the pretensioning device 86 as well, no undesirable pass-through openings for the working fluid into the interior space 28 are created in the area of the clutch piston 58. It should be pointed out here that the spring element 100 can also obviously be designed as a spring element with a ring-shaped section, from which individual elastic sections can project more-or-less in the radial direction.

Figure 3:
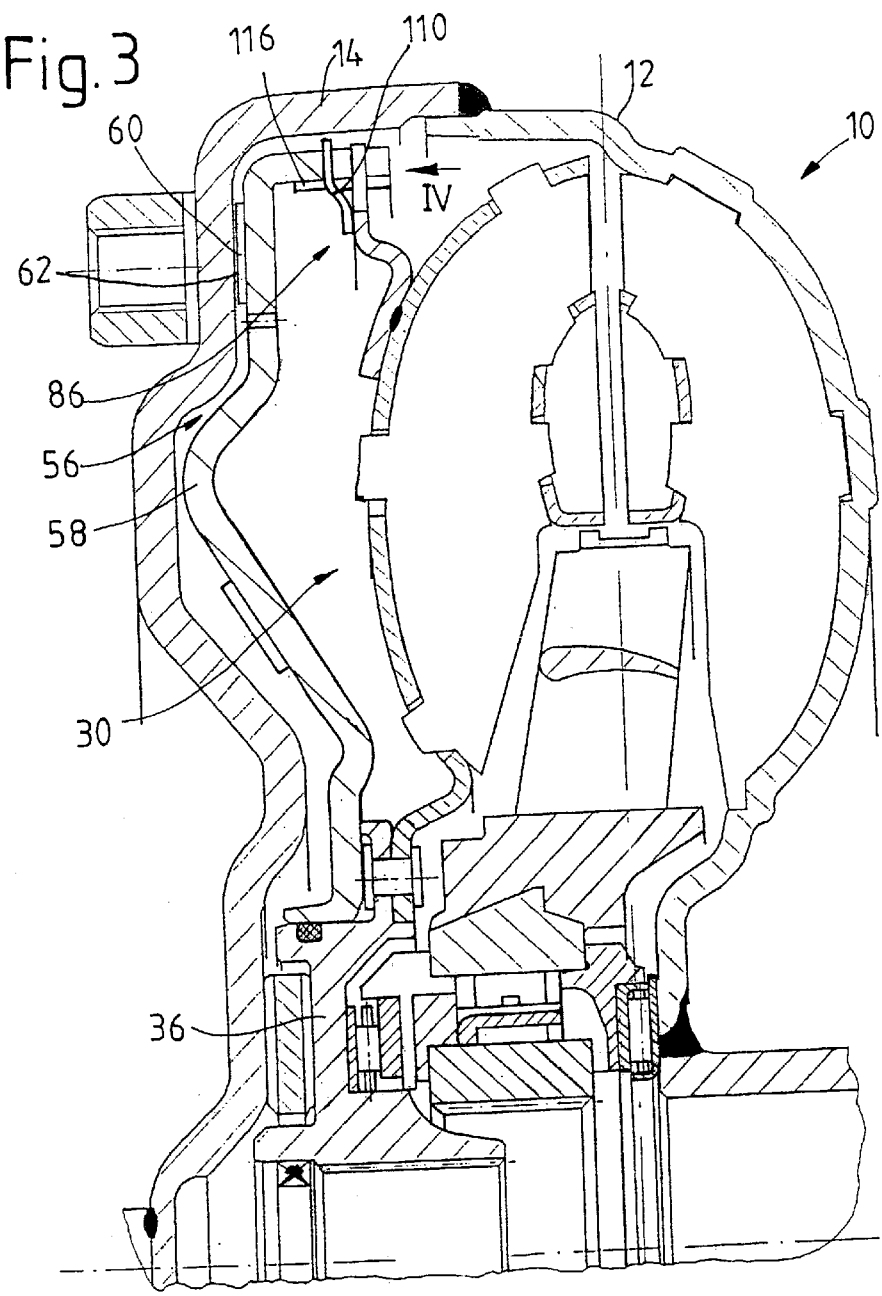
FIG. 3 shows an alternative embodiment in another view corresponding to that of FIG. 1.

FIG. 3 also shows an alternative design of the hydrodynamic torque converter according to the invention, which again is the same in terms of its basic design as that shown in FIG. 1. Reference is again made in this respect to the preceding discussion. In the case of the torque converter 10 shown in FIG. 3, the pretensioning device 86 is now located in the radially outer area, that is, radially outside the frictional interaction between the clutch piston 58 and the housing cover 14. The pretensioning device 86 comprises one or more spring elements 110, which are arranged in a row proceeding in the circumferential direction, but which for example, can also be provided as an integral part of a continuous ring. As can be see in FIG. 4, the spring element 110 or at least a section of it is located in an area which is situated between two clutch projections 66 of the essentially cylindrical section 64 of the clutch piston 58. The spring element or each spring element 110 has two elastic sections 112, 114; elastic section 112 is supported in the axial direction on the cylindrical section 64 of the clutch piston 58 between two connecting projections 66 of same, and elastic section 114 is supported axially on the driver element 70 for example, in the area of connecting projections 68 of the driver or radially inside them. So that the elastic sections 112, 114 can generate the axial pressing force required for the pretension, they must be prevented from tilting or be otherwise supported. Therefore, on both sides of the elastic sections 112, 114 (looking in the circumferential direction), support sections 116, 118 are provided on the spring element 110; these support sections are obtained, for example, by essentially rotating appropriate sections of the shaped sheet metal part out of the approximately radial main plane of the elastic sections 112, 114, and then, as can be seen in FIG. 3, by allowing them to extend approximately in the axial direction, so that they come to rest against the inside surface of the cylindrical section 64 or of the connecting projections 66 of the clutch piston 58. In this way, the spring elements 110 are prevented from tilting in an undesirable manner, and support in the radially outward direction is provided simultaneously.

As already discussed, several spring elements 110 arranged in a row in the circumferential direction can be connected integrally to each other. Thus, for example, the spring sections 112, 114 can alternate in the circumferential direction with their respective support sections 116, 118. But it is also possible to provide separate spring elements at several points around the circumference.

Figure 4:
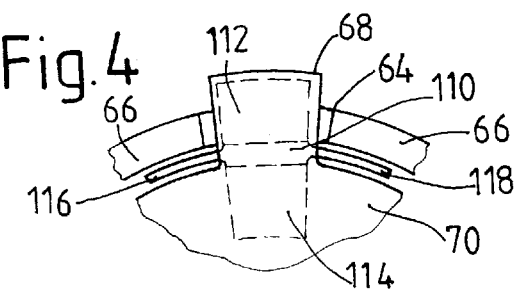
FIG. 4 shows an axial view of the embodiment shown in FIG. 3, looking in direction IV of FIG. 3.

In the case of the embodiment according to FIGS. 3 and 4, in which the pretensioning force is produced in the radial area where the frictional interaction of the bridging clutch unit 56 is also produced, it is possible to prevent almost completely any undesirable deformations of the clutch piston 58 in spite of its comparatively stiff design. This means that not even the influence of the pretensioning force will cause any nonuniform frictional interaction of the bridging clutch unit 56.

In all of the embodiments described above, the pretensioning device makes it possible to decrease the pressure difference between the two spaces on the two axial sides of the clutch piston required to press the clutch piston 58 against the cover, so that especially for the production of a bridging state the pressure level to which the space containing the turbine impeller must be raised can be kept within a range, such as in the range of approximately 0.5–1 bar, which can be provided by comparatively small or low-power fluid feed pumps.

It should also be pointed out that the hydrodynamic clutch device presented here as well as the bridging clutch device present inside it have been described only by way of example and are merely representative of a wide variety of different alternative designs. Thus, for example, it is obviously also possible for the hydrodynamic clutch device to comprise a fluid clutch, that is, a design without a stator. It is also possible for the bridging clutch unit to comprise a plurality of surfaces in frictional contact with each other instead of only two, in which case outer and inner plates which rub against each other are provided in the radially outer friction area, these plates being connected to the housing unit and to the clutch piston, respectively, for rotation in common and can be brought into frictional engagement with each other by the actuation of the clutch piston, which is able to rotate along with the turbine impeller.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A hydrodynamic clutch apparatus comprising
a housing unit having thereon a friction area,
a turbine impeller which can be rotated about an axis in the housing unit, said turbine impeller having a driver element,
a bridging clutch unit comprising a clutch element which is connected essentially non-rotatably to the turbine impeller, said clutch element having a radially outer cylindrical section with a plurality of clutch projections, said driver element having a plurality of driver elements which are in torque-transmitting engagement with said clutch projections, said clutch element having thereon a friction area which can be brought into contact with the friction area on the housing unit, and
a pretensioning device comprising at least one spring element which acts on said clutch element and on said turbine impeller to load said clutch element away from said turbine impeller and to pretension the friction area on said clutch element against the friction area on the housing unit, said at least one spring element acting between said clutch element and said driver element, said at least one spring element having an attachment area which is fixed to said turbine impeller.

2. A hydrodynamic clutch apparatus as in claim 1 wherein said clutch element is movable relative to said turbine impeller parallel to said rotational axis.

3. A hydrodynamic clutch apparatus as in claim 2 wherein said turbine impeller has a hub, said clutch element being mounted on said hub for sliding movement in a fluid tight manner.

4. A hydrodynamic clutch apparatus as in claim 3 wherein said clutch element is essentially rigid between said hub of said turbine impeller and said friction area.

5. A hydrodynamic clutch as in claim 1 wherein said clutch projections extend essentially axially and said driver projections extend essentially radially, said clutch projections engaging between said driver projections in an essentially clearance free manner.

6. A hydrodynamic clutch as in claim 1 wherein said at least one spring element comprises a corrugated spring element fixed to said turbine impeller and acting on said clutch element.

7. A hydrodynamic clutch apparatus comprising:
a housing unit having thereon a friction area;
a turbine impeller which can be rotated about an axis in the housing unit;
a bridging clutch unit comprising a clutch element which is connected essentially non-rotatably to the turbine impeller, said clutch element having thereon a friction area which can be brought into contact with the friction area on the housing unit; and a pretensioning device comprising at least one leaf spring element which acts on said clutch element and on said turbine impeller to load said clutch element away from said turbine impeller and to pretension the friction area on said clutch element against the friction area on the housing unit, said at least one leaf spring element having an attachment area, which is fixed to said turbine impeller, and an actuating area, which acts on said clutch element.

8. A hydrodynamic clutch apparatus as in claim 7 wherein said turbine impeller has a hub, said at least one leaf spring element being fixed to said hub.

9. A hydrodynamic clutch apparatus as in claim 7 wherein said at least one spring element comprises a corrugated spring element, said corrugated spring element being fixed to said turbine impeller and acting on said clutch element.

10. A hydrodynamic clutch apparatus as in claim 7 wherein said clutch element is movable relative to said turbine impeller parallel to said rotational axis.

11. A hydrodynamic clutch apparatus as in claim 10 wherein said turbine impeller has a hub, said clutch element being mounted on said hub for sliding movement in a fluid-tight manner.

12. A hydrodynamic clutch apparatus as in claim 11 wherein said clutch clement is essentially rigid between said hub of said turbine impeller and said friction area.

13. A hydrodynamic clutch apparatus comprising:

a housing unit having thereon a friction area;

a turbine impeller which can be rotated about an axis in the housing unit, said turbine impeller having a hub;

a bridging clutch unit comprising an essentially rigid clutch element which is connected essentially non-rotatably to the turbine impeller, said clutch element comprising a cylindrical section supported on said hub for sliding movement parallel to said axis in a fluid-tight manner, said clutch apparatus further comprising a sealing element between said cylindrical section and said hub, said clutch element having thereon a friction area which can be brought into contact with the friction area on the housing unit; and a pretensioning device comprising at least one leaf spring element having an attachment area which is fixed to said turbine impeller and an actuating area which acts on said clutch element to load said clutch element away from said turbine impeller and to pretension the friction area on said clutch element against the friction area on the housing unit.

14. A hydrodynamic clutch apparatus as in claim 13 wherein said at least one leaf spring element is fixed to said hub.

15. A hydrodynamic clutch apparatus as in claim 13 wherein said at least one spring element comprises one of a disk spring element and a corrugated spring element, said at least one spring element being supported on said turbine impeller and on said clutch element.

16. A hydrodynamic clutch as in claim 13 wherein said sealing element comprises an O-ring.

* * * * *